Knox & Corrister.
Fluting Machine.

No. 3861. Reissued Mar. 1. 1870.

Witnesses.
Wm Drewen
Thos. Dusch

Inventor.
J. Knox
N. D. Corrister
Pattison & Co
Attys

UNITED STATES PATENT OFFICE.

SUSAN R. KNOX, OF NEW YORK, N. Y., FOR HERSELF, AND ASSIGNEE OF W. D. CORRISTER.

IMPROVEMENT IN FLUTING-MACHINES.

Specification forming part of Letters Patent No. 53,633, dated April 3, 1866; Reissue No. 3,861, dated March 1, 1870.

*To all whom it may concern:*

Be it known that Mrs. SUSAN R. KNOX and W. D. CORRISTER, of the city, county, and State of New York, invented new and useful Improvements in Fluting-Machines; and that the following is a full, clear, and exact description thereof, which will enable those skilled in the art to make and use the same, reference being had to the accompanying drawing, forming part of this specification.

This invention relates to machines for making "fluting-trimming," so called, used by ladies in the trimming of their dresses, and for fluting the trimming of under-garments, &c.; and consists in so arranging one of the two fluted rollers (between which the material to be fluted, such as linen, lace, &c., is passed) that it can be readily raised or removed from the other, in order that the material passing between them can be removed therefrom; and, furthermore, it consists in an arrangement of parts whereby the rollers can be adjusted with regard to each other so as to produce a greater or lesser pressure upon the material passing between them, as may be desired.

Heretofore, when desired to remove the material being fluted by the rollers before it had entirely passed between them, it has been done by reversing the motion of the rollers, thus causing the material to travel back, the great objection to which has been that as the material repassed between the rollers there was necessarily produced irregularity in the fluting, which, as is obvious, was exceedingly disadvantageous.

By this invention this objection is entirely obviated, as will be readily apparent from the following detail description thereof, the material being at any time and at any point of its length susceptible of an easy removal from the machine.

Figure 1:
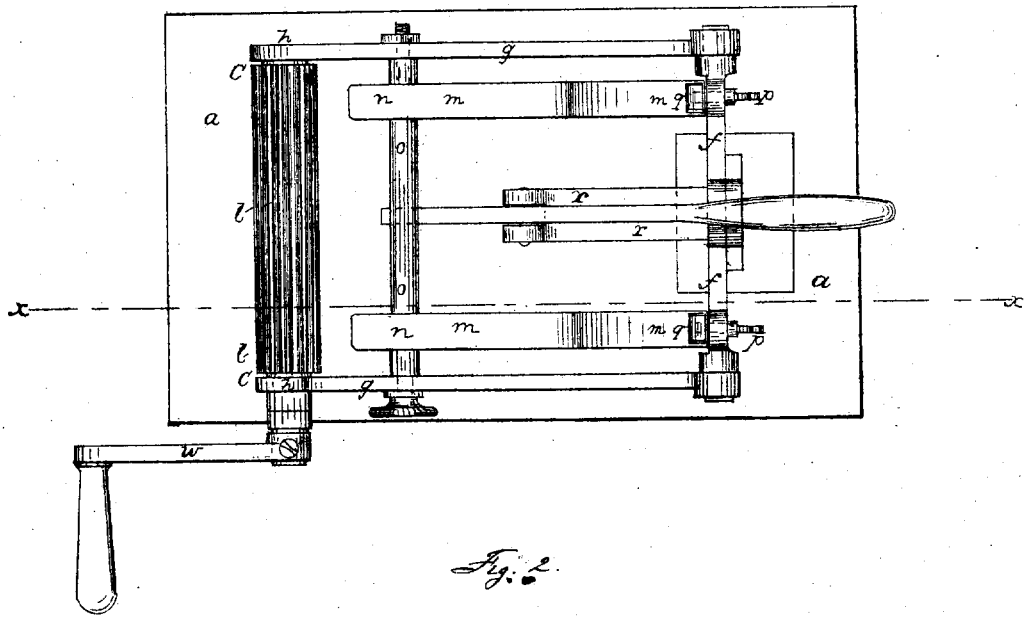
Figure 2:
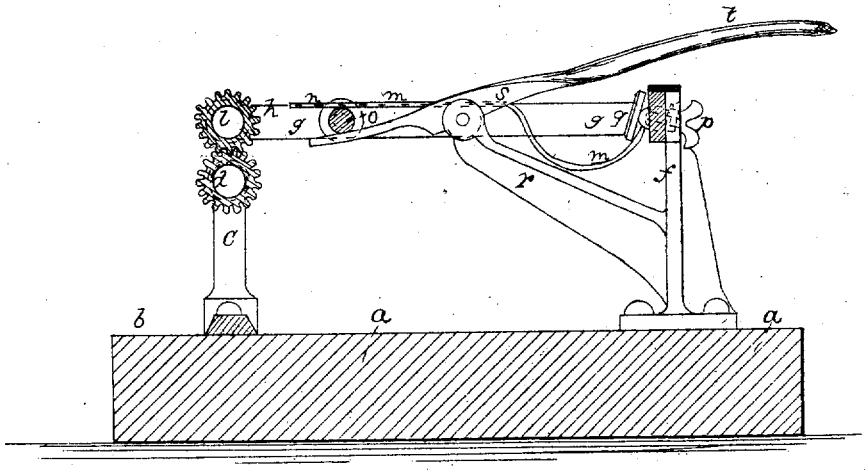

In accompanying plate of drawings our improvement is illustrated, Figure 1 being a plan or top view of the machine; and Fig. 2, a longitudinal vertical section, taken in the plane of the line *x x*, Fig. 1.

*a a* in the drawings represent the bed-plate of the machine, which may be either the top of a table, or a separate piece of wood, or other suitable material, at one end of which, *b*, are two upright standards, *c c*, at a short distance apart, between which one of the fluted rollers, *d*, is hung, turning at each end in suitable bearings thereof; *f*, a standard-frame, placed somewhat back of the position of the fluted roller *d*, and secured to the bed-plate *a* in any proper manner, to which frame is hung, in a horizontal plane, a frame, *g*, so as to be freely turned thereon. In the outer end, *h*, of this horizontal frame *g*, and extending across the same, another fluted roller, *l*, (similar in size and shape to the roller *d*,) is hung so as to turn therein, the corrugations of which roller *l* interlock with the corrugations in the roller below it, as clearly illustrated.

The frame *g* is held firmly down, so as to bring its roller in close contact with the roller *d*, by means of metallic spring-plates *m m*, fastened at one end to the fixed standard-frame *f*, and both bearing by their other ends, *n n*, upon the cross bar or rod *o* of the frame *g*, between its roller *l* and its hinged end.

The pressure with which the frame-roller *h* is made to bear upon the roller *d* is regulated at pleasure by simply turning the thumb-screw *p p*, that holds the springs to the frame *f*, which through their head-plate *q* thus increase or decrease the stiffness of the springs, as the case may be, and as is evident without further explanation.

In the upper end of the projecting arm *r* of the standard-frame *f* is hung a lever, *s*, one end of which is provided with a suitable handle, *t*, while the other passes under the cross-bar *o* of the horizontal frame *g*, so that by pressing down upon the handle end of the lever the frame *g* is caused to be swung upward, thus lifting the roller *l* from the roller *d*, the frame, when the hand is withdrawn from the lever-handle, falling by its own weight, aided by the force of the springs *m m*.

The hollow fluted rolls being heated by inserted irons, or in any suitable way, the material to be fluted is passed in and between the two fluted rollers, motion being communicated to such rollers through a crank-handle, *w*, secured to one end of the lower roller, *d*, which motion can be continued till the whole of the material has been passed through them, unless desired to withdraw the same before being fully fluted, when the upper roller is raised, as before described, thus allowing the material to be readily removed, the advantages of which are evident to all.

The rollers *d* and *l* are so arranged in their respective bearings that they can be easily detached therefrom, when desired to use rollers having larger or smaller corrugations, and as there are various well-known ways in which this can be accomplished, it is not deemed necessary to describe any one particular arrangement.

Having thus described the invention, what is claimed as new, and desired to be secured by Letters Patent, is—

1. A fluting-machine in which the rolls can be readily disengaged from each other by mechanical means to permit the extrication of the material at pleasure, as hereinbefore set forth.

2. In combination with a stationary frame carrying one of the rolls, and a movable frame carrying the other roll, a variable spring-pressure device acting upon the movable frame, substantially as and for the purpose set forth.

MRS. SUSAN R. KNOX. [L. S.]

Witnesses:
WM. H. BISHOP,
CHAS. A. SCOTT.